United States Patent Office 3,502,636
Patented Mar. 24, 1970

3,502,636
SOLUTION POLYMERIZATION OF ISOPRENE WITH ALUMINIUM TRIALKYL TITANIUM TETRACHLORIDE CATALYST ACTIVATED BY ETHERS AND HALOGENATED ALKANES
Josef Witte, Cologne-Stammheim, and Gottfried Pampus and Nikolaus Schön, Leverkusen, Germany, assignors to Farbenfabriken Bayer Aktiengesellschaft, Leverkusen, Germany, a corporation of Germany
No Drawing. Filed Mar. 8, 1966, Ser. No. 532,587
Claims priority, application Germany, May 24, 1965, F 46,132
The portion of the term of the patent subsequent to June 4, 1985, has been disclaimed
Int. Cl. C08d 1/14, 3/12
U.S. Cl. 260—94.3                         7 Claims

ABSTRACT OF THE DISCLOSURE

Production of polyisoprenes having predominantly 1,4-cis-linkages by polymerizing isoprene in a hydrocarbon solvent containing an aluminium trialkyl-titanium tetrachloride catalyst activated by 0.05 to 5 mols of an ether per mol of aluminium trialkyl and 0.05 to 50 mols, per mol of titanium compound, of an alkane having at least two halogen atoms on the same or on adjacent carbon atoms.

---

It is known that isoprene can be polymerised with organometallic mixed catalysts of aluminium trialkyls and titanium (IV) chloride to give polyisoprene in which the monomer units are linked by 1,4-cis-bonds. It is possible by this process to obtain a polyisoprene which is similar in many respects to natural rubber.

Unfortunately, this polymerisation process, which is described for example, in British patent specification No. 827,365, has a number of serious disadvantages. Polymerisation in solution in aromatic hydrocarbons yields a polyisoprene of low gel content and relatively low molecular weight. Although polymerisation in aliphatic solvents yields a cis-1,4-polyisoprene of somewhat higher molecular weight, the gel content of this product is undesirably high. Quite apart from the solvent, however, high catalyst concentrations are required to obtain an 85 to 90% conversion of the monomer to form cis-1,4-polyisoprene. For example, polymerisation processes have been described in which catalyst concentrations of 6% by weight and higher, based on the isoprene used, are used and which requires polymerisation times of 18 to 20 hours in order to polymerise 90% of the monomer. A number of measures have already been proposed with a view to improving polymerisation. For example, it is proposed in U.S. patent specification No. 3,047,559, to carry out polymerisation in the presence of ethers. This method of polymerisation is said to yield a product of relatively low gel content. The catalyst concentrations required are again around 6% by weight and higher, based on isoprene. Apart from economic considerations, the large quantities of catalyst which are used complicate working-up very considerably because as much as possible of the catalyst residues must be removed from the polymer if it is desired to obtain a high-grade synthetic rubber. Although the quantity of catalyst required in the process described in German Patent No. 1,117,877 is small, the polyisoprene yield, too, is small (5%).

According to some of applicants' earlier proposals (compare copending application Ser. No. 493,908, filed Oct. 7, 1965), it is possible to increase the polymerisation rate in spite of an extremely low catalyst concentration, by polymerising isoprene with organometallic mixed catalysts of aluminium trialkyls and titanium (IV) chloride in aliphatic or aromatic solvents, in the presence of halogenoalkanes carrying at least two halogen atoms on the same or on adjacent carbon atoms. These halogen alkanes are preferably chloro alkanes and bromalkanes with 1 to 6 carbon atoms which carry at least two chlorine or bromine atoms on the same or on adjacent carbon atoms.

A process for the solution polymerisation of isoprene in organic solvents by means of a catalyst comprising titanium tetrachloride and an aluminium trialkyl, has now been found which comprises preparing the catalyst from the titanium compound and the aluminium trialkyl in the presence of 0.05 to 5 moles of an ether, per mole of aluminium trialkyl, and adding to the polymerisation solution, 0.05 to 50 moles, per mole of titanium compound, of an alkane carrying at least two halogen atoms on the same or on adjacent carbon atoms.

It is preferred to use 0.02 to 2 moles of the ether, per mole of aluminium trialkyl. The halogen atoms are preferably chlorine and bromine atoms.

The addition of ether further reduces the quantity of catalyst required to produce the same polymerisation rate or considerably increases the polymerisation rate for the same quantity of catalyst.

According to U.S. patent specification No. 3,047,559, the addition of ethers during the preparation of organometallic mixed catalysts for the polymerisation of isoprene leads to a decrease in the polymerisation rate and a reduction of the gel content of the polymer.

Surprisingly, it is possible by the addition of ethers in combination with halogenoalkanes carrying at least two chlorine atoms or bromine atoms on the same or on adjacent carbon atoms, in the process according to the invention, to obtain an increase in the polymerisation velocity without any appreciable changes in the properties of the polymer. It is therefore possible by virtue of the measures proposed in accordance with the invention to obtain high conversions of monomer with greatly reduced quantities of catalyst and at high polymerisation rate.

Suitably ethers for use in the process according to the invention include open-chained aliphatic ethers such as di-n-butyl ether and diisoamyl ether; polypropylene oxide of low molecular weight and, finally, aromatic or mixed aliphatic-aromatic ethers, such as diphenyl ether or anisole.

Aluminium trialkyls whose alkyl groups contain from 2 to 6 carbon atoms, are mainly suitable for use as the aluminium trialkyls. Aluminium triethyl and aluminium triisobutyl are preferably used.

Aromatic or aliphatic hydrocarbons, for example, benzene toluene, hexane, iso-octane or cyclohexane, can be used as the solvents.

Suitable halogenohydrocarbons carrying at least two chlorine or bromine atoms on the same or on adjacent carbon atoms include, for example, 1,1-dichloroethane, 1,2-dichloroethane, dibromomethane, 1,2-dibromomethane, 1,1,2-tribromoethane, 1,2-dichloro- and 1,2-dibromoethane and, preferably, 1,1,2,2,-tetrachloroethane and 1,1,2,2-tetrabromoethane, or chlorine and bromine containing compounds, for example, 1,2-dichloro-1,2-dibromoethane.

Polymerisation may be carried out either continuously or batchwise.

In one preferred embodiment of the invention, the aluminium trialkyl is initially added to the solvent-monomer mixture, followed by the ether, the halogenoalkane and finally by the titanium (IV) chloride. It is important firstly that the catalyst should be prepared in the presence of monomeric isoprene, and secondly that the aluminium trialkyl and the ether are reacted together before the titanium (IV) chloride is introduced.

For example, a mixture of solvent and isoprene is initially introduced into a polymerisation vessel. 0.5 to 5, preferably 1 to 3, millimoles of aluminium trialkyl per 100 g., of isoprene, and the most favourable quantity of one of the aforementioned ethers, which must be determined for each ether by polymerisation tests, are then added to this mixture.

The halogenohydrocarbon is then added, followed by the titanium (IV) chloride which is added in such a quantity that the molar ratio of aluminium to titanium compound is from 0.9:1 to 1.25:1. The quantity in which the halogenoalkane is added is dependent upon the type of compound used, and may be from 0.05 to 50 moles per mole of titanium (IV) chloride. The catalyst may also be prepared in a part of the solvent-monomer mixture by adding the components in the aforementioned order, ageing the resulting mixture at —5 to 50° C., preferably at 15 to 30° C. and adding it to the remainder of the solvent-isoprene mixture. Polymerisation which may take from 2 to 8 hours is carried out at temperatures in the range from —5 to 50° C., preferably in the range from 0 to 30° C. On completion of polymerisation, a sufficient quantity of a lower aliphatic alcohol, such as ethanol or isopropanol, or an organic acid, such as stearic acid or disproportionated resin acid, may be added in order to destroy the catalyst. The conventional stabilisers such as, for example, 2,6-di-tert.-butyl-4-methylphenol, may be used.

The polymer may be isolated by precipitation with a lower aliphatic alcohol or, in a preferred embodiment, by distilling off the solvent with steam.

The polymers obtained by the process according to the invention, are polyisoprenes, at least 80% and, in most instances, 95 to 98% of whose double bonds have the cis-1,4-configuration.

It is possible in the process according to the invention to influence the molecular weight of the resulting cis-1,4-polyisoprene by variation in the polymerisation temperature and/or catalyst concentration so as to provide a polymer whose molecular weight is suited to the purpose for which the polymer is to be used. The resulting polyisoprene rubber may be used for the same purposes as natural rubber.

Example 1

(a) 1500 ml. of n-hexane and 240 g. of isoprene are introduced, in the absence of air and moisture, into a vessel equipped with stirring mechanism. 0.77 g. of aluminium triethyl and 0.2 g. of di-n-butyl ether are then added with stirring. After this mixture has been thoroughly stirred, 1.6 g. of 1,1,2,2-tetrachloroethane are added, followed by 1.07 g. of titanium (IV) chloride. Polymerisation is carried out at 25° C. and is stopped after 5 hours by the addition of 30 g. of ethanol and 0.8 g. of 2,6-di-tert.-butyl-4-methylphenol. The polyisoprene is precipitated with methanol and dried in vacuo at 50° C. Yield: of theoretical, $[\eta]=3.26$, content of cis-1,4-linkage: 97.5%.

(b) The procedure of test (a) was repeated, except that no di-n-butyl ether was added. Yield: 187 g.=78.2%

(b) The procedure of test (a) was repeated, except that no di-n-butyl ether was added. Yield: 187 g.=78.2% of theoretical, $[\eta]=3.26$, content of cis-1,4-linkage; 97.5%.

(b) The procedure of test (a) was repeated, except that no di-n-butyl ether was added. Yield: 187 g.=78.2% of theoretical, $[\eta]=3.47$, content of cis-1,4-linkage: 97.6%.

Examples 2 to 8

The procedure of Example 1 was repeated for Examples 2 to 6 which are summarised in Table 1. Examples 2, 7 and 8 are comparison tests:

TABLE 1

| Example No. | 2 | 3 | 4 | 5 | 6 | 7 | 8 |
|---|---|---|---|---|---|---|---|
| n-Hexane (ml.) | 1,500 | 1,500 | 1,500 | 1,500 | 1,500 | 1,500 | 1,500 |
| Isoprene (g.) | 240 | 240 | 240 | 240 | 240 | 240 | 240 |
| Al(C$_2$H$_5$)$_3$ (g.) | 0.77 | 0.77 | 0.77 | 0.77 | 0.77 | 0.77 | 3.0 |
| n(C$_4$H$_9$)$_2$O (g.) | 0 | 0.1 | 0.2 | 0.3 | 0.8 | 0 | 0 |
| Cl$_2$CH—CHCl$_2$ (g.) | 1.6 | 1.6 | 1.6 | 1.6 | 1.6 | 10.7 | 4.55 |
| TiCl$_4$ (g.) | 1.07 | 1.07 | 1.07 | 1.07 | 1.07 | 10.7 | 4.55 |
| Polymerisation temp. (° C.) | 30 | 30 | 30 | 30 | 30 | 30 | 30 |
| Polymerisation time (hours) | 5 | 5 | 5 | 5 | 5 | 5 | 5 |
| Yield (percent) of theoretical | 80 | 89 | 94 | 96 | 0 | 25 | 80 |
| $[\eta]$ | 3.55 | 3.3 | 3.3 | 3.8 |  | 3.0 | 3.1 |
| Mooney viscosity (ML-4′ 100° C.) | 40 | 46 | 43 | 48 |  |  | 30 |

Examples 9 to 12

The procedure of Example 1 was repeated for Examples 9 to 12. The details are set out in Table 2. Examples 9 and 11 are comparison tests.

TABLE 2

| Example No. | 9 | 10 | 11 | 12 |
|---|---|---|---|---|
| n-Hexane (ml.) | 1,500 | 1,500 | 1,500 | 1,500 |
| Isoprene (g.) | 200 | 200 | 200 | 200 |
| Al(C$_2$H$_5$)$_3$ (g.) | 0.63 | 0.63 | 0.63 | 0.63 |
| n(C$_4$H$_9$)$_2$O (g.) |  | 0.17 |  | 0.17 |
| Cl$_2$CH—CHCl$_2$ (g.) | 1.6 | 1.6 |  |  |
| CH$_2$Cl—CH$_2$Cl (g.) |  |  | 3.2 | 3.2 |
| TiCl$_4$ (g.) | 0.892 | 0.892 | 0.892 | 0.892 |
| Polymerisation time and temperature | 5 hours, 30° C. | | | |
| Yield: (percent) | 79 | 94 | 49 | 65 |
| Mooney ML-4′ | 55 | 57 | 49 | 52 |
| Percent cis-1,4-linkage | 97.2 | 97.7 | 97.6 | 97.5 |

Examples 13 to 22

The polymerisation reactions were carried out as follows:

In each example, 500 parts by weight of dry n-hexane (water content 0.001% by weight) were mixed in the absence of moisture with 100 parts by weight of pure isoprene in a vessel equipped with stirring mechanism and through which nitrogen was passed. 0.325 part by weight of aluminium triethyl were added with stirring to each of the solutions at 15 to 20° C. This was followed by the addition of di-n-butyl ether and then by the addition of a bromo-hydrocarbon. Finally, 0.445 part by weight of titanium tetrachloride were added to each solution. The polymerisation reactions were carried out at temperatures around 15° C. The polymerisation reactions of Examples 13 to 17 and 19 to 22 and the polymerisation reaction of Examples 18 were stopped after 5 and 3 hours, respectively, by the addition in each instance of a solution of 1 part by weight of 2,6-di-tert.-butyl-4-methylphenol and 2 parts by weight of N-methyl-diethanolamine in 20 parts by weight of benzene. The polymers were precipitated from their solutions with ethanol and dried in vacuo at 50° C. The results of Examples 13 to 22 and the quantities in which the di-n-butyl ether and bromohydrocarbon were used, are set out in Table 3:

TABLE 3

| Example No. | Bromo-hydrocarbon in parts by weight | (nC$_4$H$_9$)$_2$O in parts by weight | Yield (percent) | Mooney viscosity (ML-4′ 100° C.) | Defo (DIN 53514) | Structure 3,4-content |
|---|---|---|---|---|---|---|
| 13 | Br$_2$CH—CHBr$_2$, 0.097 |  | 15 | 40 |  | 2.7 |
| 14 | Br$_2$CH—CHBr$_2$, 0.097 | 0.085 | 47 |  | 1,700/38 | 2.5 |
| 15 | Br$_2$CH—CHBr$_2$, 0.097 |  | 75 | 65 | 1,350/34 |  |
| 16 | Br$_2$CH—CHBr$_2$, 0.186 |  | 45 |  | 1,300/32 | 2.0 |
| 17 | Br$_2$CH—CHBr$_2$, 0.186 | 0.085 | 98 | 79 | 1,400/34 | 2.2 |
| 18 | Br$_2$CH—CHBr$_2$, 0.186 | 0.14 | 100 | 60 | 1,170/30 | 2.1 |
| 19 | BrClCH—CHClBr, 0.42 |  | 50 | 65 |  | 2.0 |
| 20 | BrClCH—CHClBr, 0.42 | 0.085 | 93 | 72 | 1,375/32 | 2.0 |
| 21[1] | BrClCH—CHClBr, 0.075 |  | 60 | 55 | 950/33 | 2.4 |
| 22 | BrClCH—CHClBr, 0.075 | 0.085 | 80 | 80 | 1,650/33 | 2.3 |

[1] In Example 19, the polymerisation temperature was 30° C.

Examples 23–25

The procedure of Example 1 was repeated for Examples 23 to 25. The details are set out in the following table. Example 23 is a comparison test.

TABLE

[Test with diisoproypl ether]

| Example No. | 23 | 24 | 25 |
|---|---|---|---|
| n-Hexane (ml.) | 1,500 | 1,500 | 1,500 |
| Isoprene (g.) | 200 | 200 | 200 |
| $Al(C_2H_5)_3$ (g.) | 0.64 | 0.64 | 0.64 |
| $Iso-(C_3H_7)_2O$ (g.) | | 0.51 | 1.02 |
| $Br_2CHCHBr_2$ (g.) | 0.3 | 0.3 | 0.3 |
| $TiCl_4$ (g.) | 0.892 | 0.982 | 0.892 |
| Polymerisation temp. (° C.) | 25 | 25 | 25 |
| Polymerisation time (hours) | 5 | 5 | 5 |
| Yield (percent) | 70 | 88 | 42 |
| ML–4′/100° C | 61 | 55 | |

Examples 26–30

The procedure of Example 1 was repeated for Examples 26 to 30. The details are set out in the following table. Examples 26 and 27 are comparison tests.

TABLE

[Tests with diphenyl ether]

| Example No. | 26 | 27 | 28 | 29 | 30 |
|---|---|---|---|---|---|
| n-Hexane (ml.) | 1,500 | 1,500 | 1,500 | 1,500 | 1,500 |
| Isoprene (g.) | 200 | 200 | 200 | 200 | 200 |
| $Al(C_2H_5)_3$ (g.) | 0.64 | 0.64 | 0.64 | 0.64 | 0.64 |
| $(C_6H_5)_2O$ (g.) | | | 0.85 | 1.70 | 2.0 |
| $Br_2CH-CHBr_2$ (g.) | | 0.3 | 0.3 | 0.3 | 0.3 |
| $TiCl_4$ (g.) | 0.892 | 0.892 | 0.892 | 0.892 | 0.892 |
| Polymerisation temperature (° C.) | 25 | 25 | 25 | 25 | 25 |
| Polymerisation time (hours) | 5 | 5 | 5 | 5 | 5 |
| Yield (percent) | 28 | 67 | 80 | 95 | 95 |
| ML–4′/100° C | | 70 | 63 | 50 | 50 |

Example 31

(a) *Preparation of the catalyst.*—100 parts by volume of n-hexane and 2 parts by volume of isoprene are mixed while stirring at 5–10° C. in the absence of air and moisture, in a vessel equipped with stirring mechanism, with 48 parts by weight of aluminium triethyl, 1.85 parts by weight of di-n-butylether, 2.85 parts by weight of 1,1-2,2-tetrabromoethane and 6.65 parts by weight titaniumtetrachloride. The resulting brown catalyst suspension is stirred at 20° C. for another 15 minutes.

(b) *Polymerization.*—3500 parts by weight of isoprene and 17,500 parts by weight of n-hexane are placed in a vessel equipped with a stirring mechanism. The catalyst suspension prepared as described in Example 31(a) is then introduced with stirring under pressure into an autoclave charged with solvent monomer. Polymerisation of isoprene starts immediately. The polymerisation temperature is kept at 25–30° C. by external cooling. After 3 hours the polymerisation is stopped by addition of a mixture of 50 parts by weight of hexane and 1 part by weight of 2,6-di-tert.-butyl-4-methylphenol. The polymer is precipitated from the hexane solution with methanol and dried at 50° C. in vacuo. Yield: 3300 parts by weight, percent 1,4-cis-structure: 98.2, $(\eta)=5.8$, Mooney-value (ML–4′/100° C.): 85.

What we claim is:

1. A process for producing polyisoprene having predominantly 1,4-cis-linkages which comprises polymerizing isoprene while dissolved in a hydrocarbon solvent containing an aluminium trialkyl-titanium tetrachloride catalyst activated by 0.05 to 5 moles of an ether, per mole of aluminium trialkyl, and 0.05 to 50 moles, per mole of titanium compound, of an alkane carrying at least two halogen atoms on the same or on adjacent carbon atoms.

2. The process of claim 1 wherein said catalyst is prepared in the presence of isoprene.

3. The process of claim 2, wherein said catalyst is prepared by adding to a solution of isoprene in a hydrocarbon solvent in order said aluminium trialkyl, said ether, said alkane and said titanium tetrachloride in the quoted proportions.

4. The process of claim 3 wherein said catalyst is prepared in the presence of part of the isoprene to be polymerized, whereafter said catalyst is aged at a temperature of −5 to 50° C. for some minutes to several hours 5. The process of claim 1 wherein said polymerization is carried out at a temperature between −5 and +50° C.

6. The process of claim 1 wherein said aluminium trialkyl and said titanium tetrachloride are used in molar proportions varying between 0.9 to 1 and 1.25 to 1.

7. A catalyst composition prepared by adding to a solution of isoprene in a hydrocarbon solvent therefor, aluminium triethyl, di-n-butyl ether, a polyhalogenoethane, and $TiCl_4$, the aforesaid components being added to the solution in the order set forth above.

References Cited

UNITED STATES PATENTS 3,116,274  12/1931  Boehm, et al. _____ 260—94.9
3,180,858   4/1965  Farrar _____ 260—94.3

FOREIGN PATENTS 851,113  10/1960  Great Britain.

JOSEPH L. SCHOFER, Primary Examiner

R. A. GAITHER, Assistant Examiner

U.S. Cl. X.R.:

252—429